UNITED STATES PATENT OFFICE 2,519,348

AQUEOUS DISPERSIONS AND METHODS OF PREPARING THE SAME

Maurice R. Burnell, Noroton Heights, Conn., and William J. van Loo, Jr., Rye, N. Y., assignors to American Cyanamid Company, New York, N. Y., a corporation of Maine No Drawing. Application December 9, 1948, Serial No. 64,418

12 Claims. (Cl. 260—29.6)

This invention relates to certain new and useful improvements in aqueous dispersions and in methods of preparing the same, and more particularly is concerned with the production of relatively stable, homogeneous, aqueous dispersions which are adapted for use, especially after further dilution with water, in imparting flame-resisting characteristics to cotton cloth and other fibrous cellulosic materials of the class consisting of natural and regenerated celluloses and mixtures thereof.

The present invention is an improvement upon the aqueous dispersions disclosed and claimed in the copending application of Anne MacMillan Loukomsky, Roy H. Kienle and Theodore F. Cooke, Serial No. 64,416, filed concurrently herewith, and includes the method of preparing such aqueous dispersions involving the improvement which consists in incorporating into such a dispersion ammonium hydroxide in an amount corresponding to not less than about 4% by weight of the dispersion, of ammonium hydroxide containing approximately 28% $NH_3$.

The aqueous dispersions of the present invention comprise water and ingredients comprising

A (1) A finely divided, oxygen-containing substance of the group consisting of tin, titanium, antimony and bismuth oxides and mixtures thereof;

(2) A thermoplastic substance containing at least 20% by weight of combined halogen and capable of rupturing under heat at carbon-halogen bonds;

B (3) A water-soluble salt of an oxygen-containing acid of phosphorus wherein the phosphorus atom has a valence of 5;

(4) A water-soluble nitrogenous substance of the group consisting of urea, biuret, ammonium cyanate, ammonium dicyanimide and mixtures thereof; and (5) Ammonium hydroxide.

The ingredients of (1) and (2) are employed in a weight ratio of 1 part of the former to form 0.6 to 20 parts, more particularly from 0.8 to 4 parts, of the latter. The ingredients of (3) and (4) are employed in a weight ratio of 1 part of the former calculated as phosphoric acid ($H_3PO_4$) to from 1 to 20 parts, more particularly from 2 to 6 parts, of the latter. The ingredients of (A) and (B) are present in the aqueous dispersion in a weight ratio of 1 part of the former to from 0.2 to 8 parts, more particularly from 1 to 3 parts, of the latter. The amount of ammonium hydroxide which is present corresponds to not less than about 4%, more particularly from 4% to about 9%, and preferably approximately 6%, by weight of the aqueous dispersion, of ammonium hydroxide containing approximately 28% $NH_3$. The total amount of water which is present in the aqueous dispersion, including that which is present in combination with ammonia in the form of ammonium hydroxide, is from about 15% to about 35%, more particularly from 15 to 25%, and preferably approximately 20%, by weight of the dispersion.

The aqueous dispersions of our invention are relatively stable aqueous compositions. Depending upon the amount of water which is present therein and other influencing factors they may vary from liquids of varying viscosities to pasty masses or semi-solids at room temperature (about 65°–95° F.), the latter being converted into free-flowing liquids when heated at an elevated temperature, e. g., at temperatures up to about 160° F. In general, they are characterized by their room-temperature stability against separation of solids for a prolonged period, as evidenced by the fact that aqueous dispersions of our invention have shown no separation of solids when allowed to remain undisturbed at room temperature for periods of more than 1 week, more particularly for periods ranging between 1 month and 1 year. The pH of our dispersions, as initially prepared, usually is between about 6 or 6.5 and 8 or 8.5. The preferred aqueous dispersions also are dilutable with water to yield a dispersion containing approximately 50% by weight of solids, which dilute dispersion shows no separation of solids upon standing undisturbed at room temperature for a period of at least 24 hours, e. g., for 36 to 48 hours and longer.

The aqueous dispersions of the present invention are adapted for use, especially after dilution with water, in imparting flame resistance to a cellulosic material, more particularly a cellulosic material of the class consisting of natural and regenerated celluloses and mixtures thereof, by methods such as are more fully described and are specifically claimed in the aforementioned Loukomsky et al. copending application with particular reference to the aqueous dispersions disclosed and claimed in that application.

The present invention is based on our discovery that by incorporating ammonium hydroxide into aqueous dispersions of the kind described in the aforesaid Loukomsky et al. copending application, using a certain minimum quantity of ammonuim hydroxide and keeping the total amount of water within certain critical limits, it is possible to obtain an aqueous dispersion which is stable upon storage for a prolonged period at room temperature and which is dilutable with water as has been mentioned hereinbefore. This is a discovery of considerable practical importance and in no way could have been predicted from the known characteristics of ammonium hydroxide or from the characteristic properties of the aqueous dispersion described in the aforementioned Loukomsky et al. application or from the properties of the ingredients used in the preparation of such a dispersion. The invention appears to be specific to the use of ammonium hydroxide, since aqueous solutions of other alkalies were tried, more particularly aqueous solutions of sodium hydroxide, potassium hydroxide and lithium hydroxide, but all were ineffective and could not be used, as they resulted in the formation of insoluble reaction products in the dispersions.

The practical advantages of our discovery will be immediately apparent to those skilled in the art. The stability of our dispersions, without separation of solid material or, otherwise stated, without separation of clear liquid, for prolonged periods makes it unnecessary to use the dispersion shortly after its preparation. Hence it can be made and shipped wherever needed by a finisher of textile goods in the treatment of textiles to render them resistant to flame. Since it can be prepared in the form of concentrated aqueous dispersions containing a relatively small amount of water, the user does not have to pay freight charges on a large amount of water. Instead, the textile finisher merely adds to the dispersion before using the same an amount of water sufficient to bring the dispersion to the concentration of solids which he requires for his particular use.

The dispersions of our invention are prepared by incorporating ammonium hydroxide into the dispersion of the kind briefly described above and more fully in the aforementioned Loukomsky et al. application at a suitable stage in the manufacture of the dispersion, the amount of ammonium hydroxide employed corresponding to not less than about 4%, by weight of the final aqueous dispersion containing all of the ingredients, of ammonium hydroxide containing approximately 28% $NH_3$. The amount of ammonium hydroxide specified above as the lower limit is the minimum required to obtain the desired results, as unsatisfactory results were obtained when ammonium hydroxide containing approximately 28% $NH_3$ was used in an amount corresponding to 3% by weight of the dispersion. It does not appear that there is any critical upper limit to the amount of ammonium hydroxide employed, from the standpoint of the amount of $NH_3$ introduced into the dispersion, but only in so far as the larger amounts of ammonium hydroxide may result in introducing an objectionably large amount of water into the dispersion. Ordinarily the amount of ammonium hydroxide introduced into the dispersion corresponds to from not less than 4% and not more than about 9%, more particularly from 5% to 7 or 8%, and preferably approximately 6%, by weight of the dispersion, of ammonium hydroxide containing approximately 28% $NH_3$. It is not necessary to use only the concentrated form of ammonium hydroxide containing approximately 28% $NH_3$, since, if desired, the more dilute forms of ammonium hydroxide may be employed provided that the amount used does not introduce an excessive amount of water in the dispersion, so that its stability against the separation of solids, or separation into two phases, would be objectionably affected.

One method of preparing our new aqueous dispersions comprises dissolving in water with the aid of heat, e. g., at a temperature between 140° F. and 210° F., ingredients comprising (1) a water-soluble salt of an oxygen-containing acid of phosphorus wherein the phosphorus atom has a valence of 5, e. g., a guanidine phosphate, a diguanidine pyrophosphate, diammonium hydrogen phosphate, sodium polyphosphate, ammonium metaphosphate, the mono-, di- and trialkylamine pyrophosphates, etc., and (2) a water-soluble nitrogenous substance of the group aforementioned, the ingredients of (1) and (2), which are collectively designated as (B), being employed in weight ratios such as have been mentioned hereinbefore. The amount of water employed in dissolving the ingredients of (1) and (2) is such as will yield an approximately saturated solution, at a temperature of about 140° F. to about 160° F., of these ingredients. When the preferred ingredients, viz., monoguanidine phosphate and urea, are employed, a saturated solution can be produced by using such a relatively small amount of water that solids separate from the saturated solution when it is at a temperature of 140°–160° F. Any solids that separate may be redissolved by heating the resulting saturated solution at a higher temperature of the order of 170° F. to 200° F. To the resulting solution is then added ammonium hydroxide in an amount corresponding to not less than about 4%, more particularly from 4½ or 5 to 8 or 9%, by weight of the final aqueous dispersion containing all of the ingredients, of ammonium hydroxide containing approximately 28% $NH_3$. This solution is preferably at an elevated temperature not higher than about 180° F. when the ammonium hydroxide is added thereto. Temperatures above 180° F. are not precluded but have the objection that they create more of a hazard to the workman when adding the ammonium hydroxide thereto. Best results are usually obtained when the solution is at a temperature of the order of 165° F. to 175° F., e. g., about 170° F., prior to the addition of the ammonium. A slight drop in the temperature of the solution generally results when the ammonium hydroxide is added to the solution. The ammonium hydroxide may be heated, if desired, to avoid such a drop in temperature or the solution itself may be further heated, after adding the $NH_4OH$, to maintain the ingredients in solution.

To the resulting hot solution of the aforementioned water-soluble substances is added and dispersed therein an aqueous dispersion containing (3) a finely divided, oxygen-containing substance of the group consisting of tin, titanium, antimony and bismuth oxides and mixtures thereof and (4) a thermoplastic substance containing at least 20% by weight of combined halogen and capable of rupturing under heat at carbon-halogen bonds. Examples of the thermoplastic substances of (4) that may be employed, alone or in the form of mixtures thereof, are halogen-containing vinyl resins in which not less than 20%, advantageously not less than 40% by weight of combined chlorine or other halogen is present, for instance, polyvinyl halides (e. g., polyvinyl chloride, polyvinyl bromide, etc.), polyvinylidene halides (e. g., polyvinylidene chloride, polyvinylidene bromide, etc.), copolymers of a vinyl halide and a vinylidene halide (e. g., a copolymer of vinyl chloride and vinylidene chloride), copolymers of a vinyl halide and an acrylic ester (for instance, a copolymer of vinyl chloride and an alkyl acrylate, e. g., methyl, ethyl, propyl, butyl, etc., acrylates), halogenated (e. g., chlorinated) paraffins containing not less than 20% by weight of combined halogen, more particularly from about 30 or 40% up to 70 or 75% by weight of combined chlorine, bromine or other halogen. The ingredients of (3) and (4), which are collectively designated as (A), are used in weight ratios such as have been mentioned hereinbefore; and the ingredients of (A) and (B) likewise are employed in weight ratios with respect to each other such as previously have been given. The total amount of water used in preparing the dispersion is controlled so that the dispersion containing all of the ingredients has present therein from about 15% to about 35%, more particularly from 15% to 25 or 30%, and preferably approximately 20%, by weight of water. The final step in preparing the dispersion consists in vigorously agitating the hot dispersion, which initially may be at a temperature of the order of 150° F. to 180° F. or higher, while rapidly cooling the same to a temperature of the order of 50° F. to 80° or 90° F. In this way the crystals of the water-soluble phosphate and of the water-soluble nitrogenous substance are finely divided, and the stability of the dispersion against the separation of solids is improved.

Still another method may be employed for preparing the aqueous dispersions of our invention, which dispersions, like those of the above-described method, are stable against the separation of solids for a prolonged period at room temperature. This method is essentially the same as that described above with the exception that the finely divided antimony oxide or other finely divided, oxygen-containing substance is dispersed in the water having dissolved therein the water-soluble salt of the oxygen-containing acid of phosphorus and the water-soluble nitrogenous substance before the ammonium hydroxide is added thereto; and the aqueous dispersion comprising the halogenated thermoplastic substance is then added to the ammonium hydroxide-modified dispersion of the other ingredients.

When the finely divided metallic oxide (or mixture of metallic oxides) is incorporated into the dispersion in combination with the halogen-containing thermoplastic substance, this may be done, for instance, by first preparing a dispersion of the finely divided metallic oxide in water with the aid of a suitable dispersing agent, e. g., a sodium, potassium or other alkali-metal salt of a condensation product of formaldehyde and a naphthalene sulfonic acid. This dispersion may be passed through a colloid mill in order to reduce the particle size to, for example, one micron or less. To the resulting dispersion is then added a dispersion of the halogen-containing thermoplastic substance, more particularly a polyvinyl halide polymerization product containing at least 40% by weight of combined halogen, and still more particularly a polyvinyl chloride polymerization product containing at least 40% by weight of combined chlorine, e. g., polyvinyl chloride itself or a vinyl chloride copolymer comprising mainly vinyl chloride, for instance a copolymer of, by weight, 80 to 99% of vinyl chloride (in the copolymer molecule) and 20 to 1% of another monomeric material containing a $CH_2=C<$ grouping which is copolymerizable therewith, for instance, vinylidene chloride, a lower alkyl acrylate (e. g., methyl, ethyl, etc., acrylates), or a vinyl ester of an aliphatic monocarboxylic acid (e. g., vinyl acetate, vinyl propionate, etc.), or other thermoplastic substance containing at least 20% by weight of combined halogen and capable of rupturing under heat at carbon-halogen bonds. This mixture is thoroughly agitated until a homogeneous liquid composition or dispersion is obtained.

A more specific example of the preparation of such a dispersion of the metallic oxide and halogen-containing thermoplastic substance is as follows:

A small amount of dispersing agent, more particularly 13 parts by weight of a sodium salt of a condensation product of formaldehyde and a naphthalene sulfonic acid, is dissolved in 577 parts by weight of water. Under rapid stirring with a homogenizing type of stirrer, 410 parts by weight of antimony trioxide is added to the solution. The resulting dispersion is then passed through a colloid mill to reduce the particle size to one micron or less. One hundred and thirty-six (136) parts of the antimony trioxide dispersion is added to an aqueous dispersion containing 55-56% by weight of an unplasticized vinyl chloride copolymer containing between 80 and 95% by weight of vinyl chloride in the copolymer. The aqueous dispersion of the vinyl chloride copolymer may be, and preferably is, the product which is available from the B. F. Goodrich Chemical Company, Akron, Ohio, under the trade name of "Geon Latex X-15."

The vinyl chloride copolymer used in the above aqueous dispersion and in dispersions referred to in other examples which follow, may be, for example, a copolymer of, by weight, about 80% to about 95%, e. g., about 85 to 90%, of vinyl chloride and about 20% to about 5%, e. g., about 15% to 10%, of an alkyl acrylate, more particularly a lower alkyl acrylate such, for instance, as methyl, ethyl, propyl or butyl acrylate.

When the finely divided antimony trioxide or other metallic oxide of the kind used in practicing our invention is incorporated with the water-soluble oxygen-containing acid of phosphorus and the water-soluble nitrogenous substance prior to the addition of the ammonium hydroxide and the halogen-containing thermoplastic substance, this may be done, for instance, by adding the metallic oxide in the form of a dispersion, prepared as has just been described, to the water containing the other ingredients. Or, the metallic oxide and a suitable dispersing agent, e. g., a sodium salt of a condensation product of formaldehyde and a naphthalene sulfonic acid, may be added to the water containing the other ingredients, and the metallic oxide dispersed therein while the water-soluble components are dissolving in the water.

In order that those skilled in the art better may understand how the present invention may be carried into effect, the following examples are given by way of illustration and not by way of limitation. All parts and percentages are by weight.

Example 1

| | Parts |
|---|---|
| Monoguanidine phosphate | 436 |
| Dispersing agent, more particularly a sodium salt of a condensation product of formaldehyde and a naphthalene sulfonic acid | 5 |
| Finely divided antimony trioxide | 147 |
| Urea | 872 |
| Ammonium hydroxide (approx. 28% NH₃) | 120 |
| Aqueous dispersion containing 55-56% by weight of an unplasticized vinyl chloride copolymer containing between 80 and 95% by weight of vinyl chloride in the copolymer | 236 |
| Water | 157 |

The water was added first to a mixing tank provided with means for heating, cooling and stirring the contents, and the remaining materials were added in the order listed. The monoguanidine phosphate, dispersing agent and antimony trioxide were added to the water, and stirring and heating of the mixture were begun. The urea was slowly fed into the mixture so that the endothermic reaction held the temperature constant. Heating was continued until the salts had completely dissolved, the mixture being brought to a temperature of about 180°–190° F. Cooling was then started (by discontinuing the introduction of steam into the jacket of the tank), and at 170° F. the ammonium hydroxide was added. This caused the temperature to drop to about 160° F. When the temperature had reached 155° F. the aqueous dispersion containing the vinyl chloride copolymer was slowly added, the contents of the mixing tank then being warmed so that its temperature would not fall below about 150° F.

The hot dispersion was passed through a preheated conduit into the first of two Votators (made by The Girdler Corporation, Louisville, Kentucky). The jacket of the first half of the first Votator was heated slightly in order to avoid too rapid crystallization at the inlet line with the possibility of plugging the inlet line. The second half of the first Votator and the entire second Votator were cold jacketed, and the water flow was manually adjusted so that the thoroughly agitated and rapidly cooled dispersion being discharged from the Votator was at a temperature of about 80°–85° F. (A Votator is a specific type of apparatus in which the dispersion can be vigorously agitated with rapid cooling.)

The finished, homogeneous dispersion contained about 81.8% by weight of solids. It was a stable dispersion having a storage stability at room temperature of more than five months. It was dilutable with water to 55% solids content, the dilute dispersion being stable on standing at room temperature for a period of more than 24 hours. It had a pH of about 7.2.

Example 2

This example illustrates the results obtained when the ammonium hydroxide containing approximately 28% NH₃ constitutes 4%, 6% and 9% by weight of the aqueous dispersion, and for purpose of comparison there are also given the results when the same concentration of ammonium hydroxide constitutes 3% by weight of the dispersion.

| Amount of NH₄OH in the dispersion | 3% | 4% | 6% | 9% |
|---|---|---|---|---|
| | Parts | Parts | Parts | Parts |
| Urea | 1,624.50 | 1,624.50 | 1,083.0 | 1,624.50 |
| Monoguanidine phosphate | 813.00 | 813.00 | 542.0 | 813.00 |
| Dispersing agent, more particularly a sodium salt of a condensation product of formaldehyde and a naphthalene sulfonic acid | 8.85 | 8.85 | 5.9 | 8.84 |
| Finely divided antimony trioxide | 271.50 | 271.50 | 181.0 | 271.50 |
| Aqueous dispersion containing 55-56% by weight of an unplasticized vinyl chloride copolymer as in Example 1 | 475.50 | 475.50 | 317.0 | 475.50 |
| Ammonium hydroxide (approx. 28% NH₃) | 112.50 | 150.00 | 150.0 | 337.50 |
| Water | 444.00 | 406.50 | 221.0 | 219.00 |
| pH of dispersion | 6.4 | 6.6 | 7.0 | 8.1 |
| Character of dispersion | Unstable, relatively thin, clear liquid separated on standing for 24 hours. | Stable, no separation of clear liquid on standing for more than 1 week. | Stable, very viscous, no separation of clear liquid on standing for more than 6 months. | Stable, thick paste, no separation of clear liquid on standing for more than 6 months. |

Each of the above dispersions was prepared by heating to about 180° F., while stirring vigorously, a mixture containing all of the aforementioned ingredients with the exception of the aqueous dispersion ("Geon Latex X-15") containing the vinyl chloride copolymer. The resulting dispersion was cooled to about 150° F., at which temperature the dispersion of the vinyl chloride copolymer was added. The mixture was vigorously agitated while rapidly cooling the same to a temperature of about 50° to 60° F.

Example 3

This example illustrates the results obtained when the ammonium hydroxide is employed in an amount corresponding to about 6 to 6.3%, by weight of the dispersion, of ammonium hydroxide containing approximately 28% NH₃, and the amount of solids in the dispersion is about 80 to 85% by weight thereof.

| Approx. amount of NH₄OH in the dispersion. | 6% | 6.3% |
|---|---|---|
| Approx. amount of solids in the dispersion. | 80% | 85% |
| | Parts | Parts |
| Urea | 86.80 | 86.80 |
| Monoguanidine phosphate | 43.20 | 43.20 |
| Dispersing agent, more particularly a sodium salt of a condensation product of formaldehyde and a naphthalene sulfonic acid. | 0.48 | 0.48 |
| Finely divided antimony trioxide. | 14.40 | 14.40 |
| Aqueous dispersion containing 55-56% by weight of an unplasticized vinyl chloride copolymer as in Examples 1 and 2. | 25.50 | 25.50 |
| Ammonium hydroxide (approx. 28% NH₃). | 12.00 | 12.00 |
| Water | 17.00 | 7.00 |
| Character of dispersion | Stable, very viscous, no separation of clear liquid on standing for more than 6 months. | Stable, thick paste, no separation of clear liquid on standing for more than 6 months. |

Each of the above dispersions was prepared in essentially the same manner as described under Example 2 with the exception that the final step consisted in vigorously agitating the mixture while rapidly cooling the same to a temperature of about 80° F.

When the formula is the same as that described above with the exception that no water is added other than that which is introduced in combination with NH₃ in the form of ammonium hydroxide and, also, in the aqueous dispersion containing the vinyl chloride copolymer, the product is a solid mass at room temperature in which the urea and monoguanidine phosphate have not entirely dissolved even though the mixture of ingredients was heated to 200° F. during its preparation.

*Example 4*

This example illustrates the results obtained when ammonium hydroxide is omitted from the formulation.

| | Parts |
|---|---|
| Urea | 083.0 |
| Monoguanidine phosphate | 541.5 |
| Dispersing agent, more particularly a sodium salt of a condensation product of formaldehyde and a naphthalene sulfonic acid. | 5.9 |
| Finely divided antimony trioxide | 181.0 |
| Aqueous dispersion containing 55-56% by weight of an unplasticized vinyl chloride copolymer as in Examples 1 and 2. | 317.0 |
| Water | 212.0 |
| pH of dispersion | 5.3 |
| Character of dispersion | Unstable dispersion of low viscosity; on standing for less than 24 hours at room temperature, Sb₂O₃ settled to the bottom and a clear aqueous layer separated at the top. |

The above dispersion was prepared by heating to about 190° F., while stirring vigorously, a mixture containing all of the aforementioned ingredients with the exception of the aqueous dispersion containing the vinyl chloride copolymer. The resulting dispersion was cooled to about 170° F., at which temperature the dispersion of the vinyl chloride copolymer was added. The mixture was vigorously agitated while rapidly cooling the same to a temperature of about 47° F.

It will be understood, of course, by those skilled in the art that our invention is not limited to the particular ingredients, proportions thereof and methods of preparation described in the above illustrative examples. As has been mentioned hereinbefore, the water-soluble nitrogenous substance may be urea, biuret, ammonium cyanate, ammonium dicyanimide, or mixtures thereof, that is, mixtures of any or all of these substances in any proportions. We prefer to use urea as the water-soluble nitrogenous substance.

Any of the oxides of tin, titanium, antimony or bismuth, or any mixtures of any of the oxides of these metals, in any proportions, may be employed. We prefer to use an oxide of antimony, more particularly antimony trioxide, as the metallic oxide.

The thermoplastic substance may be any thermoplastic material (e. g., a vinyl resin, more particularly a vinyl halide polymerization product) containing at least 20%, more particularly at least 30% and preferably at least 40%, by weight of combined halogen (e. g., chlorine, bromine, etc.) and which is capable of rupturing under heat at carbon-halogen bonds, numerous examples of which materials have been given hereinbefore. Additional examples of such thermoplastic materials are copolymers of (1) a vinyl halide, e. g., vinyl chloride and (2) a vinyl-substituted aromatic or nuclearly halogenated aromatic hydrocarbon, e. g., styrene, o-, m- and p-methyl styrenes, the various dimethyl styrenes, o-, m- and p-isopropenyl toluenes, the various mono-, di- and tri-halogeno (e. g., the mono-, di- and tri-chloro) styrenes, etc., in proportions such that the final copolymer contains at least 20% by weight of combined halogen, e. g., in a weight ratio of from about 80 to 99% of the vinyl halide of (1) to from about 20 to 1% of the vinyl compound of (2). Other examples include the halogenated diphenyls (e. g., pentachlorodiphenyl, pentabromodiphenyl, etc.) and the halogenated (e. g., chlorinated, brominated, etc.) naphthalenes, which compounds contain at least 20% by weight of combined chlorine, bromine or other halogen. We prefer to use polyvinyl chloride or a vinyl chloride copolymer containing at least 80% by weight of combined (i. e., combined in the copolymer molecule) vinyl chloride, more particularly a copolymer of, by weight, from about 80% to about 99% of vinyl chloride and from about 20% to about 1% of an acrylic ester, specifically an alkyl acrylate such, for instance, as methyl, ethyl, propyl or butyl acrylate.

Any water-soluble salt of an oxygen-containing acid of phosphorus wherein the phosphorus atom has a valence of 5, numerous examples of which have been given earlier herein and, also, in the aforementioned copending Loukomsky et al. application, may be used. Among the examples given in the said Loukomsky et al. application may be mentioned the following:

Diguanidine phosphate
Diguanidine polyphosphate
Guanylurea phosphate
Biguanide phosphate
Sodium dihydrogen phosphate
Disodium hydrogen phosphate
Dipotassium hydrogen phosphate
Ammonium polyphosphate
Ethylene diamine phosphate
Ethylene diamine polyphosphate
Primary cyclohexylamine phosphate
Primary morpholine phosphate
Secondary pyridine phosphate Mixtures of water-soluble salts of an oxygen-containing acid of phosphorus wherein the phosphorus atom has a valence of 5 may be employed, as well as salts of mixtures of such acids which include orthophosphoric acid, metaphosphoric acid and pyrophosphoric acid, the mixed acids being sometimes collectively designated as "polyphosphoric" acid.

It is important in practicing our invention that the water-soluble nitrogenous substance, the water-soluble salt of an oxygen-containing acid of phosphorus, the metallic oxide and the halogen-containing thermoplastic substance be used in proportions within the ranges hereinbefore given, for instance in the third paragraph of this specification. In this connection reference is again made to the aforementioned copending Loukomsky et al. application and especially to the examples given therein, the compositions therein described being adapted for modification with ammonium hydroxide in accordance with our invention.

The aqueous dispersions of our invention are useful in the production of a wide variety of flame-resistant cellulosic materials, e. g., wearing apparel of all kinds, especially children's clothes and clothing used by the armed forces, curtains, draperies, sheeting, furniture coverings, linings for electric blankets, net fabrics, non-woven fabrics, chenilles, etc., and which are made of cellulosic materials such as are described in the first paragraph of this specification and elsewhere herein. In some cases the concentrated dispersions as initially produced may be applied to the textile by knife-coating processes; but preferably the concentrated dispersion is diluted with a suitable amount of water so as to obtain a dilute dispersion with which the textile readily may be impregnated, e. g., by immersion in the dispersion, as is described more fully (including all of the steps of the treating process) in the aforementioned copending Loukomsky et al. application Serial No. 64,416 filed concurrently herewith.

We claim:

1. In a method of preparing an aqueous dispersion which is adapted for use in imparting flame-resisting characteristics to cotton cloth and other fibrous cellulosic materials of the class consisting of natural and regenerated celluloses and mixtures thereof, said dispersion comprising, by weight, from about 15% to about 35% of water, and ingredients comprising (1) a finely divided, oxygen-containing substance of the group consisting of tin, titanium, antimony and bismuth oxides and mixtures thereof and (2) a thermoplastic substance containing at least 20% by weight of combined halogen and capable of rupturing under heat at carbon-halogen bonds, the ingredients of (1) and (2), which together are designated hereinafter as (A), being employed in a weight ratio of 1 part of the former to from 0.6 to 20 parts of the latter and being dispersed in water containing ingredients initially in the form of (3) a water-soluble salt of an oxygen-containing acid of phosphorus wherein the phosphorus atom has a valence of 5 and (4) a water-soluble nitrogenous substance of the group consisting of urea, biuret, ammonium cyanate, ammonium dicyanimide and mixtures thereof, the ingredients of (3) and (4), which together are designated hereinafter as (B), being employed in a weight ratio of 1 part of the former calculated as $H_3PO_4$ to from 1 to 20 parts of the latter, and the ingredients of (A) and (B) being employed in a weight ratio of 1 part of the former to from 0.2 to 8 parts of the latter, the improvement which consists in incorporating into the said dispersion ammonium hydroxide in an amount corresponding to not less than about 4%, by weight of the said dispersion, of ammonium hydroxide containing approximately 28% $NH_3$.

2. In a method of preparing an aqueous dispersion which is adapted for use in imparting flame-resisting characteristics to cotton cloth and other fibrous cellulosic materials of the class consisting of natural and regenerated celluloses and mixtures thereof, said dispersion comprising, by weight, from 15 to 25% of water, and ingredients comprising (1) a finely divided oxide of antimony and (2) a thermoplastic vinyl resin containing at least 40% by weight of combined chlorine, the ingredients of (1) and (2), which together are designated hereinafter as (A), being employed in a weight ratio of 1 part of the former to from 0.6 to 20 parts of the latter and being dispersed in water containing ingredients initially in the form of (3) a water-soluble guanidine phosphate and (4) urea, the ingredients of (3) and (4), which together are designated hereinafter as (B), being employed in a weight ratio of 1 part of the former calculated as $H_3PO_4$ to from 1 to 20 parts of the latter, and the ingredients of (A) and (B) being employed in a weight ratio of 1 part of the former to from 0.2 to 8 parts of the latter, the improvement which consists in incorporating into the said dispersion, during its preparation, ammonium hydroxide in an amount corresponding to from 4 to 9%, by weight of the said dispersion, of ammonium hydroxide containing approximately 28% $NH_3$.

3. The method of preparing a relatively stable aqueous dispersion which is adapted for use in imparting flame-resisting characteristics to cotton cloth and other fibrous cellulosic materials of the class consisting of natural and regenerated celluloses and mixtures thereof, said method comprising dissolving in water with the aid of heat (1) a water-soluble salt of an oxygen-containing acid of phosphorus wherein the phosphorus atom has a valence of 5 and (2) a water-soluble nitrogenous substance of the group consisting of urea, biuret, ammonium cyanate, ammonium dicyanimide and mixtures thereof, the ingredients of (1) and (2), which together are designated hereinafter as (B), being employed in a weight ratio of 1 part of the former calculated as $H_3PO_4$ to from 1 to 20 parts of the latter, and the amount of water employed being such as will yield an approximately saturated solution, at a temperature of about 140° F. to about 160° F., of the said ingredients of (1) and (2); adding to the resulting solution, at an elevated temperature not higher than about 180° F., ammonium hydroxide in an amount corresponding to from 4% to about 9%, by weight of the final aqueous dispersion containing all of the ingredients, of ammonium hydroxide containing approximately 28% $NH_3$; mixing with the solution to which the ammonium hydroxide has been added and dispersing therein an aqueous dispersion containing (3) a finely divided, oxygen-containing substance of the group consisting of tin, titanium, antimony and bismuth oxides and mixtures thereof and (4) a thermoplastic substance containing at least 20% by weight of combined halogen and capable of rupturing under heat at carbon-halogen bonds, the ingredients of (3) and (4), which together are designated hereinafter as (A), being employed in a weight ratio of 1 part of the former to from 0.6 to 20 parts of the latter, the ingredients of (A) and (B) being employed in a weight ratio of 1 part of the former to from 0.2 to 8 parts of the latter and the dispersion, after adding the dispersion comprising the ingredients of (3) and (4), comprising, by weight, from about 15% to about 35% of water; and agitating the resulting dispersion while rapidly cooling the same thereby to obtain an aqueous dispersion which is stable against separation of solids for a prolonged period at room temperature.

4. A method as in claim 3 wherein the water-soluble salt of (1) is a water-soluble guanidine phosphate, the water-soluble nitrogenous substance of (2) is urea, the finely divided oxygen-containing substance of (3) is antimony trioxide and the thermoplastic substance of (4) is a vinyl chloride polymerization product containing at least 40% by weight of combined chlorine.

5. The method of preparing a relatively stable aqueous dispersion which is adapted for use in imparting flame-resisting characteristics to cotton cloth and other fibrous cellulosic materials of the class consisting of natural and regenerated celluloses and mixtures thereof, said method comprising dispersing in water with the aid of heat ingredients comprising (1) a water-soluble salt of an oxygen-containing acid of phosphorus wherein the phosphorus atom has a valence of 5, (2) a water-soluble nitrogenous substance of the group consisting of urea, biuret, ammonium cyanate, ammonium dicyanimide and mixtures thereof and (3) a finely divided, oxygen-containing substance of the group consisting of tin, titanium, antimony and bismuth oxides and mixtures thereof, the ingredients of (1) and (2), which together are designated hereinafter as (B), being employed in a weight ratio of 1 part of the former calculated as $H_3PO_4$ to from 1 to 20 parts of the latter, and the amount of water employed being such as will yield an approximately saturated solution, at a temperature of about 140° F. to about 160° F., of the said ingredients of (1) and (2); adding to the resulting dispersion, at an elevated temperature not higher than about 180° F., ammonium hydroxide in an amount corresponding to from 4% to about 9%, by weight of the final aqueous dispersion containing all of the ingredients, of ammonium hydroxide containing approximately 28% $NH_3$; mixing with the dispersion to which the ammonium hydroxide has been added and dispersing therein an aqueous dispersion comprising (4) a thermoplastic substance containing at least 20% by weight of combined halogen and capable of rupturing under heat at carbon-halogen bonds, the ingredients of (3) and (4), which together are designated hereinafter as (A), being employed in a weight ratio of 1 part of the former to from 0.6 to 20 parts of the latter, the ingredients of (A) and (B) being employed in a weight ratio of 1 part of the former to from 0.2 to 8 parts of the latter and the dispersion, after adding the dispersion containing the thermoplastic substance of (4), comprising, by weight, from about 15% to about 35% of water; and agitating the resulting dispersion while rapidly cooling the same thereby to obtain an aqueous dispersion which is stable for a prolonged period at room temperature.

6. A method as in claim 5 wherein the water-soluble salt of (1) is a water-soluble guanidine phosphate, the water-soluble nitrogenous substance of (2) is urea, the finely divided oxygen-containing substance of (3) is antimony trioxide and the thermoplastic substance of (4) is a vinyl chloride polymerization product containing at least 40% by weight of combined chlorine.

7. The method of preparing a relatively stable aqueous dispersion which is adapted for use in imparting flame-resisting characteristics to cotton cloth and other fibrous cellulosic materials of the class consisting of natural and regenerated celluloses and mixtures thereof, said method comprising dissolving in water with the aid of heat (1) monoguanidine phosphate and (2) urea, the ingredients of (1) and (2), which together are designated hereinafter as (B), being employed in a weight ratio of 1 part of the former calculated as $H_3PO_4$ to form 2 to 6 parts of the latter, and the amount of water employed being such as will yield an approximately saturated solution, at a temperature of about 150° F., of the said ingredients of (1) and (2); adding to the resulting solution, at a temperature between about 160° F. and about 180° F., ammonium hydroxide in an amount corresponding to not less than 4% and not more than about 9%, by weight of the final aqueous dispersion containing all of the ingredients, of ammonium hydroxide containing approximately 28% $NH_3$; adding to the solution to which the ammonium hydroxide has been added and dispersing therein an aqueous dispersion containing (3) finely divided antimony trioxide and (4) a vinyl chloride polymerization product containing at least 40% by weight of combined chlorine, the ingredients of (3) and (4), which together are designated hereinafter at (A), being employed in a weight ratio of 1 part of the former to from 0.8 to 4 parts of the latter, the ingredients of (A) and (B) being employed in a weight ratio of 1 part of the former to from 1 to 3 parts of the latter and the dispersion, after adding the dispersion comprising the ingredients of (3) and (4), containing from 15 to 25% by weight of water; and agitating the resulting dispersion while rapidly cooling the same to a temperature between about 50° F. and about 90° F., thereby to obtain an aqueous dispersion which, when diluted with water to yield a dispersion containing approximately 50% by weight of solids, shows no separation of solids upon standing undisturbed at room temperature for a period of at least 24 hours.

8. The method of preparing a relatively stable aqueous dispersion which is adapted for use in imparting flame-resisting characteristics to cotton cloth and other fibrous cellulosic materials of the class consisting of natural and regenerated celluloses and mixtures thereof, said method comprising dispersing in water with the aid of heat ingredients comprising (1) monoguanidine phosphate, (2) urea and (3) finely divided antimony trioxide, the ingredients of (1) and (2), which together are designated hereinafter as (B), being employed in a weight ratio of 1 part of the former calculated at $H_3PO_4$ to from 2 to 6 parts of the latter, and the amount of water employed being such as will yield an approximately saturated solution, at a temperature of about 150° F., of the said ingredients of (1) and (2); adding to the resulting dispersion, at a temperature between about 160° F. and about 180° F., ammonium hydroxide in an amount corresponding to not less than 4% and not more than about 9%, by weight of the final aqueous dispersion containing all of the ingredients, of ammonium hydroxide containing approximately 28% $NH_3$; adding to the dispersion to which the ammonium hydroxide has been added and dispersing therein an aqueous dispersion containing (4) a vinyl chloride polymerization product containing at least 40% by weight of combined chlorine, the ingredients of (3) and (4), which together are designated hereinafter as (A), being employed in a weight ratio of 1 part of the former to from 0.8 to 4 parts of the latter, the ingredients of (A) and (B) being employed in a weight ratio of 1 part of the former to from 1 to 3 parts of the latter and the dispersion, after adding the dispersion containing the vinyl chloride polymerization product of (4), containing from 15 to 25% by weight of water; and agitating the resulting dispersion while rapidly cooling the same thereby to obtain an aqueous dispersion which, when diluted with water to yield a dispersion containing approximately 50% by weight of solids, shows no separation of solids upon standing undisturbed at room temperature for a period of at least 24 hours.

9. An aqueous dispersion which is adapted for use in imparting flame-resisting characteristics to cotton cloth and other fibrous cellulosic materials of the class consisting of natural and regenerated celluloses and mixtures thereof, said dispersion comprising water and ingredients comprising (1) a finely divided, oxygen-containing substance of the group consisting of tin, titanium, antimony and bismuth oxides and mixtures thereof and (2) a thermoplastic substance containing at least 20% by weight of combined halogen and capable of rupturing under heat at carbon-halogen bonds, the ingredients of (1) and (2), which together are designated hereinafter as (A), being employed in a weight ratio of 1 part of the former to form 0.6 to 20 parts of the latter and being dispersed in water containing ingredients initially in the form of (3) a water-soluble salt of an oxygen-containing acid of phosphorus wherein the phosphorus atom has a valence of 5 and (4) a water-soluble nitrogenous substance of the group consisting of urea, biuret, ammonium cyanate, ammonium dicyanimide and mixtures thereof, the ingredients of (3) and (4), which together are designated hereinafter as (B), being employed in a weight ratio of 1 part of the former calculated as $H_3PO_4$ to from 1 to 20 parts of the latter, and the ingredients of (A) and (B) being employed in a weight ratio of 1 part of the former to from 0.2 to 8 parts of the latter, said dispersion also containing ammonium hydroxide in an amount corresponding to not less than about 4% by weight thereof of ammonium hydroxide containing approximately 28% $NH_3$, the total amount of water which is present in the said dispersion, including that which is present in combination with ammonia in the form of ammonium hydroxide, being from about 15% to about 35% by weight of the dispersion.

10. An aqueous dispersion which is adapted for use in imparting flame-resisting characteristics to cotton cloth and other fibrous cellulosic materials of the class consisting of natural and regenerated celluloses and mixtures thereof, said dispersion comprising water and ingredients comprising (1) finely divided antimony trioxide and (2) a vinyl chloride polymerization product containing at least 40% by weight of combined chlorine, the ingredients of (1) and (2), which together are designated hereinafter as (A), being employed in a weight ratio of 1 part of the former to from 0.8 to 4 parts of the latter and being dispersed in water containing ingredients initially in the form of (3) monoguanidine phosphate and (4) urea, the ingredients of (3) and (4), which together are designated hereinafter as (B), being employed in a weight ratio of 1 part of the former calculated as $H_3PO_4$ to from 2 to 6 parts of the latter, and the ingredients of (A) and (B) being employed in a weight ratio of 1 part of the former to from 1 to 3 parts of the latter, said dispersion also containing ammonium hydroxide in an amount corresponding to not less than 4% and not more than about 9% by weight thereof, the total amount of water which is present in the said dispersion, including that which is present in combination with ammonia in the form of ammonium hydroxide, being from 15% to 25% by weight of the dispersion, and the said dispersion being dilutable with water to yield a dilute aqueous dispersion containing approximately 50% by weight of solids, which dilute dispersion shows no separation of solids upon standing undisturbed at room temperature for a period of at least 24 hours.

11. An aqueous dispersion as in claim 10 wherein the dispersion contains ammonium hydroxide in an amount corresponding to approximately 6% by weight thereof of ammonium hydroxide containing approximately 28% $NH_3$, and the total amount of water which is present in the dispersion, including that which is present in combination with ammonia in the form of ammonium hydroxide, is approximately 20% by weight of the dispersion.

12. A method as in claim 1 wherein the ammonium hydroxide is incorporated into the defined dispersion during the preparation of the latter.

MAURICE R. BURNELL.
WILLIAM J. van LOO, Jr.

REFERENCES CITED

The following references are of record in the file of this patent:

UNITED STATES PATENTS

| Number | Name | Date |
|---|---|---|
| 2,357,725 | Bennett | Sept. 5, 1944 |
| 2,413,163 | Bacon | Dec. 24, 1946 |